Feb. 27, 1962   H. MAHN   3,022,874
CONTROL MEMBER FOR OPTICAL DEVICES
Filed Aug. 26, 1960   2 Sheets-Sheet 1

INVENTOR:
Herbert Mahn
BY
*Karl F. Ross*
AGENT.

United States Patent Office 3,022,874
Patented Feb. 27, 1962

3,022,874
CONTROL MEMBER FOR OPTICAL DEVICES
Herbert Mahn, Bad Kreuznach, Germany, assignor to Jos. Schneider & Co., Optische Werke, Kreuznach, Rhineland, Germany, a corporation of Germany
Filed Aug. 26, 1960, Ser. No. 52,145
Claims priority, application Germany Sept. 5, 1959
5 Claims. (Cl. 192—4)

My present invention relates to a control member, such as a knob or a handle, for the adjustment of a movable element (e.g. diaphragm or lens) in photographic or cinematographic apparatus.

In the case of conventional varifocal optical objectives, for example, it is often desirable to change the image scale in a continuous manner when taking a motion-picture scene, thus providing the so-called zoom effect, and thereafter to lock the lens system in the focal position last reached. Prior systems for accomplishing this result were relatively complex or included demountable parts which would easily get lost during non-use.

My present invention, accordingly, has for its object the provision of an improved control member for the purpose described which is characterized by simple construction and easy operation.

In accordance with this invention I provide, on the housing of a camera or other optical apparatus containing the adjusting mechanism for a varifocal system or other element to be controlled, a preferably knob-shaped rotatable head which is covered with that mechanism and in which there is lodged an elongated handle for selective displacement between a retracted and an extended position. The handle, which in its retracted position acts to lock the head to the housing so as to prevent relative rotation therebetween, is movable in a generally radial direction into its extended position in which it releases the head and forms a lateral projection thereon to facilitate its manual adjustment. Advantageously, the handle when retracted projects but slightly beyond the outline of the head but can be pulled or pushed out of this position in either direction, thus making its utilization more convenient with different settings of the head.

According to a more specific feature of my invention, the head is coupled with the associated adjusting mechanism through the intermediary of a gear transmission having a pinion which is blocked, in the retracted position of the handle, by the engagement of one of its teeth with an arm controlled by the handle. Such an arrangement provides a wide selection of closely spaced stop positions while also affording a desired step-up (or step-down) ratio between the angle of rotation of the control head and the displacement stroke of the controlled system.

The invention will be described with greater detail with reference to the accompanying drawing in which.

Figure 1:
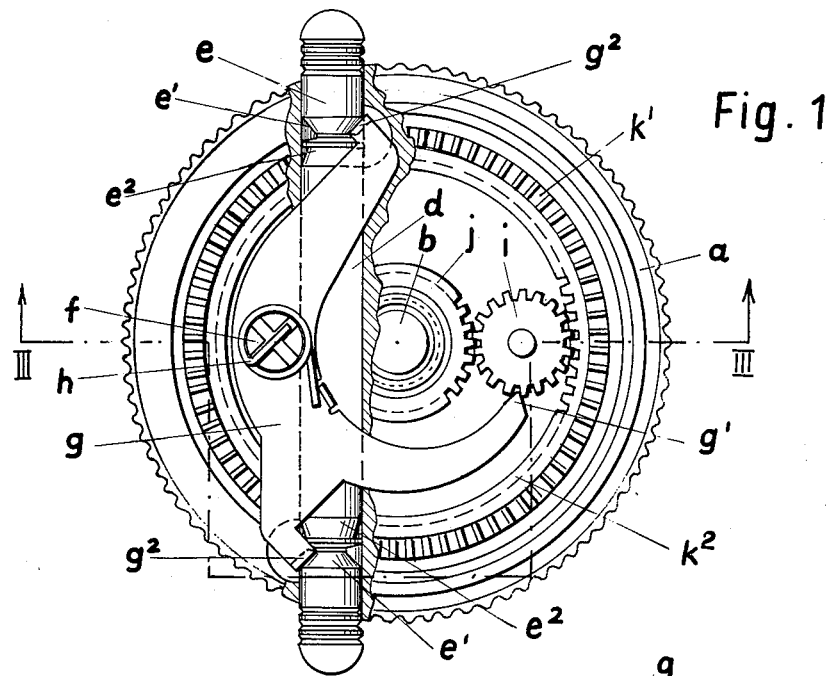
FIG. 1 is a front-elevational view, partly in section, of a control member according to the invention in the retracted position of its handle.
Figure 2:
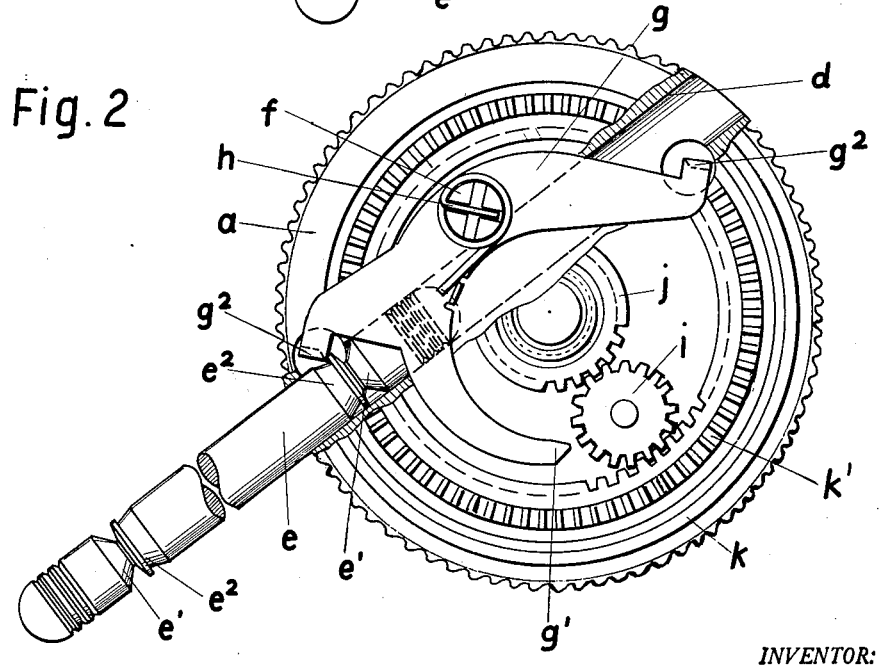
FIG. 2 is a view similar to FIG. 1 but showing the control member in a different position and with its handle extended.
Figure 3:
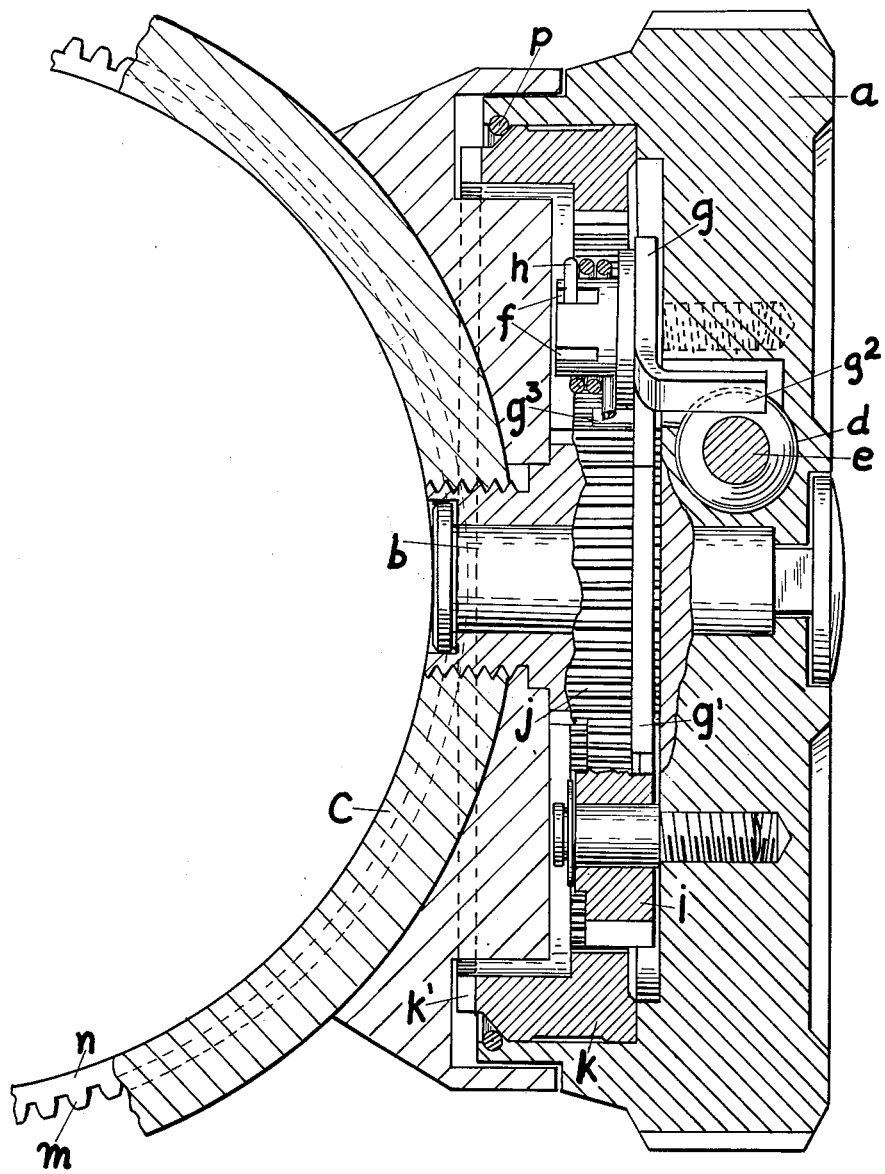
FIG. 3 is a cross-sectional view, on a larger scale, taken on the line III—III of FIG. 1 but showing also a portion of the supporting camera housing and of the controlled mechanism therein.

The control-member assembly shown in FIGS. 1, 2 and 3 is mounted on a camera housing $c$ carrying a setting ring $n$; this ring may be considered as part of the adjusting mechanism of a varifocal objective system not further illustrated. A head $a$, in the shape of a peripherally milled knob, is rotatable about the axis of a stationary sun gear $j$ which is threaded into the housing $c$ and through which passes a stub $b$ anchored to the knob $a$. This knob is provided with a nearly radial through-going bore $d$ within which an elongated handle $e$ is displaceable upwardly and downwardly, as viewed in FIG. 1, from a retracted position shown in that figure. Each of the extremities of this handle is formed with a relatively deep annular camming groove $e'$ and with a shallower indexing groove $e^2$ adapted to co-operate with two prongs $g^2$ of a three-pronged lever arm $g$, the latter being pivoted on a stud $f$ and urged by a coil spring $h$ into engagement of its prongs $g^2$ with these grooves. Arm $g$ for this purpose is provided with a lug $g^3$ serving as an abutment for an end of the spring $h$. When the handle $e$ is retracted to allow both of the prongs $g^2$ to fall into the respective groove $e'$, the third prong $g'$ of the arm enters between the teeth of a planetary pinion $i$ which meshes with the sun gear $j$. Pinion $i$ is also in mesh with the toothed inner periphery $k^2$ of a driving ring $k$, this ring having on one of its transverse faces another set of teeth $k'$ meshing with the teeth $m$ of ring $n$.

It will be apparent that the toothed elements $i$, $j$, $k$ constitute a step-up gear transmission which converts a rotation of knob $a$ into a larger rotation of ring $n$. This transmission is, however, immobilized whenever the prong $g'$ of arm $g$ engages the teeth of pinion $i$, as shown in FIG. 1. Rotation of knob $a$ is then prevented because of the fixed mounting of sun gear $j$.

The toothed ring $k$, whose rotatability relative to knob $a$ and, thereby, of the rings $k$ and $n$, it is merely necessary to depress one of the slightly projecting ends of handle $e$ whereby the prongs $g^2$ are cammed out of the groove $e'$, against the force of spring $h$, and cause clockwise rotation of the arm $g$ (as viewed in FIGS. 1 and 2) to withdraw the prong $g'$ from pinion $i$. In such position the controlled system can be adjusted by direct rotation of the milled knob $a$ itself. For greater convenience, however, the handle $e$ may be extended further, as illustrated in FIG. 2, until one of the prongs $g^2$ snaps into the opposite indexing groove $e^2$, thereby preventing complete detachment of the handle. It will be observed that grooves $e^2$ are shallow enough to prevent any reengagement of prong $g'$ with pinion $i$ in this position of the handle. The generally radial lateral projection then formed by the handle on the knob $a$ greatly facilitates the progressive adjustment of the system at a desired rate to provide a "zoom" effect.

The invention is, of course, not limited to the specific embodiment described and illustrated but may be realized in various modifications without departing from the scope of the appended claims.

I claim:

1. A control assembly for an adjustable part of an optical system, comprising a support for said system, a head rotatably mounted on said support, coupling means on said support connecting said head with said part, a handle lodged in said head for generally radial relative displacement between a retracted and an extended position, and blocking means controlled by said handle for immobilizing said head with respect to said support in said retracted position, said handle being provided with a camming recess, said blocking means comprising a swingable arm spring-urged into engagement of a portion thereof with said recess in said retracted position.

2. A control assembly according to claim 1 wherein said coupling means includes a rotatable gear on said head, said arm having an extremity spring-urged into locking engagement with said gear upon engagement of said portion with said recess.

3. A control assembly according to claim 2 wherein said handle is further provided with an additional recess engageable by said portion in an extended handle position for indexing said handle in the latter position, said additional recess being sufficiently shallower than said camming recess to prevent a locking engagement of said extremity with said gear in said extended position.

4. A control assembly for an adjustable part of an optical system, comprising a support for said system, a knob rotatably mounted on said support, an inner gear and an outer gear co-axial with said knob, a rotatable pinion eccentrically carried on said knob in mesh with both said inner and outer gears, one of said gears being rigid with said support, the other of said gears being coupled with said part, and locking means on said knob selectively engageable with the teeth of said pinion for arresting said knob in any one of several positions of adjustment of said part.

5. A control assembly according to claim 4 wherein said locking means comprises a handle movable generally radially of said knob between a substantially fully retracted and an outwardly projecting position, said handle being effective to arrest said knob in said retracted position.

References Cited in the file of this patent
UNITED STATES PATENTS

| | | |
|---|---|---|
| 1,047,936 | Hare | Dec. 24, 1912 |
| 1,969,528 | Schwarzhaupt | Aug. 7, 1934 |
| 2,574,689 | Christ | Nov. 13, 1951 |
| 2,885,937 | Donnay | May 12, 1959 |